United States Patent [19]
Leconte et al.

[11] Patent Number: 6,006,871
[45] Date of Patent: *Dec. 28, 1999

[54] PNEUMATIC DEVICE FOR LOCKING/ UNLOCKING A ROTOR TO A STATOR

[75] Inventors: Sylvain Leconte, Bois d'Arcy; Christophe Bernus, Paris; Emmanuel Truchot, Colombes, all of France

[73] Assignee: Aerospatiale Societe Nationale Industrielle of Paris, France, France

[*] Notice: This patent issued on a continued prosecution application filed under 37 CFR 1.53(d), and is subject to the twenty year patent term provisions of 35 U.S.C. 154(a)(2).

[21] Appl. No.: 08/609,757

[22] Filed: Feb. 29, 1996

[30] Foreign Application Priority Data

Mar. 2, 1995 [FR] France ................................. 9502418

[51] Int. Cl.⁶ .................................................. F16D 55/18
[52] U.S. Cl. ........................ 188/72.4; 74/5.1; 244/165
[58] Field of Search ....................... 188/72.4, 153 D, 188/368, 369, 370, 366, 73.2, 71.4; 74/5.1, 5.12, 5.14; 244/165; 192/76, 88 B, 85 AT

[56] References Cited

U.S. PATENT DOCUMENTS

| | | | |
|---|---|---|---|
| 2,940,572 | 6/1960 | Warman, Jr. ............................ | 188/366 |
| 4,042,072 | 8/1977 | Baba ................................... | 188/72.4 X |
| 4,077,499 | 3/1978 | Baram .................................. | 188/72.4 |
| 4,872,357 | 10/1989 | Vaillant De Guelis et al. . | |

FOREIGN PATENT DOCUMENTS

| | | |
|---|---|---|
| 2 389 023 | 11/1978 | France . |
| 2 549 598 | 1/1985 | France . |
| 23 42 732 | 3/1975 | Germany . |
| 24 36 006 | 2/1976 | Germany . |
| 2 129 554 | 5/1984 | United Kingdom . |

*Primary Examiner*—Robert J. Oberleitner
*Assistant Examiner*—Pamela J. Lipka
*Attorney, Agent, or Firm*—Evenson, McKeown, Edwards & Lenahan, P.L.L.C.

[57] ABSTRACT

A device for locking and unlocking a rotor to a stator, at least parallel to the rotation axis of the rotor, includes an annular rotor flange transverse to the axis, an annular stator bearing surface transverse to the axis and at least partly axially facing the annular flange, and a mobile annular bearing surface transverse to the axis and at least partially axially facing the annular flange on the opposite side of the stator annular bearing surface. The mobile annular bearing surface is formed on a thrust ring coupled radially to a stator portion and able to move axially relative thereto. An annular inflatable airbag in the stator portion axially between a stator back and the thrust ring is provided with pneumatic fluid inlet/outlet arrangements.

14 Claims, 2 Drawing Sheets

100,006,871

PNEUMATIC DEVICE FOR LOCKING/ UNLOCKING A ROTOR TO A STATOR

BACKGROUND OF THE INVENTION

1. Field of the Invention

The invention concerns the axial and radial retention of a rotor relative to a stator, in particular against vibration. The rotor is part of a reaction wheel, for example; this can be a reaction wheel for a spacecraft, in which case effective locking is required to resist vibrations generated during launch from the ground.

2. Description of the Prior Art

Mechanical solutions to provide such locking/unlocking are known in themselves.

For example, document FR-A-2 619 176 (AEROSPATIALE) (or document U.S. Pat. No. 4,872,357) proposes temporary retention of the rotor by means of an annular cable pressing locking arms provided with cams radially onto the rotor. Unlocking is effected by cutting the cable.

These mechanical solutions are satisfactory. However, they have the drawback of being complex, costly and bulky and do not cater for multiple locking/unlocking cycles (although this requirement is rarely encountered).

An object of the invention is to overcome the above-mentioned drawback and, in the case of a ground configuration, to provide a very simple means of remote control (subject only to simple connection operations).

SUMMARY OF THE INVENTION

To this end the invention proposes a device for locking and unlocking a rotor to a stator, at least parallel to the rotation axis of said rotor, including:

an annular rotor flange transverse to the axis, an annular stator bearing surface transverse to the axis and at least partly axially facing the annular flange, a mobile annular bearing surface transverse to the axis and at least partially axially facing the annular flange, on the opposite side of the stator annular bearing surface, said mobile annular bearing surface being formed on a thrust ring coupled radially to a stator portion and able to move axially relative thereto, an annular inflatable airbag in said stator portion axially between a stator back and the thrust ring, said airbag being provided with pneumatic fluid inlet/outlet means.

It will realized that the use of continuous clamping in an annular area achieves good mechanical retention minimizing the risk of generation of vibration. The larger the diameter of the clamp, the better the retention, of course.

The benefit of using a pneumatic source of locking energy, even in space (i.e. a vacuum), is great simplicity of use.

Preferred, possibly combinable features of the invention include:

the rotor annular flange has two parallel transverse faces, the rotor annular flange projects radially from the radially outside periphery of the rotor, the stator portion includes a cylindrical guide wall retaining said ring radially and guiding it axially when it moves axially, the cylindrical wall extends as far as the stator annular bearing surface, radially circumventing the rotor annular flange, said guide wall surrounds the thrust ring with clearance, the stator portion includes two radially facing cylindrical walls defining with the stator back an annular housing in which substantially all of the annular inflatable airbag is accommodated, one of said cylindrical walls is extended axially by a cylindrical guide wall of the same diameter retaining said ring radially and guiding it axially when it moves axially, said guide wall surrounds the thrust ring with clearance, the inlet/outlet means include at least one passage passing through the stator back, the inlet/outlet means include a plurality of passages opening into the airbag and each connected to a distributor, the airbag has two transverse faces and accordion-shape inside and outside radial edges, the inside and outside radial edges are each the shape of the mathematical symbol > or <, the inner and outer radial edges have an axial elasticity urging them towards a retracted configuration.

Objects, features and advantages of the invention emerge from the following description given by way of non-limiting example with reference to the appended drawings.

DETAILED DESCRIPTION OF THE PREFERRED EMBODIMENT

Figure 1:
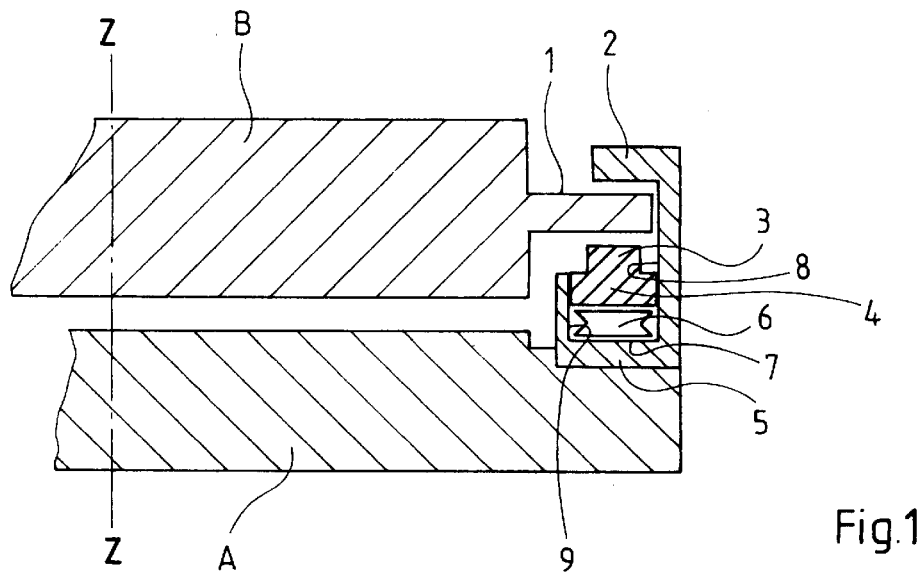
FIG. 1 is a diagrammatic half-view in axial section of a stator-rotor assembly provided with a device in accordance with the invention, shown in an unlocked configuration.
Figure 2:
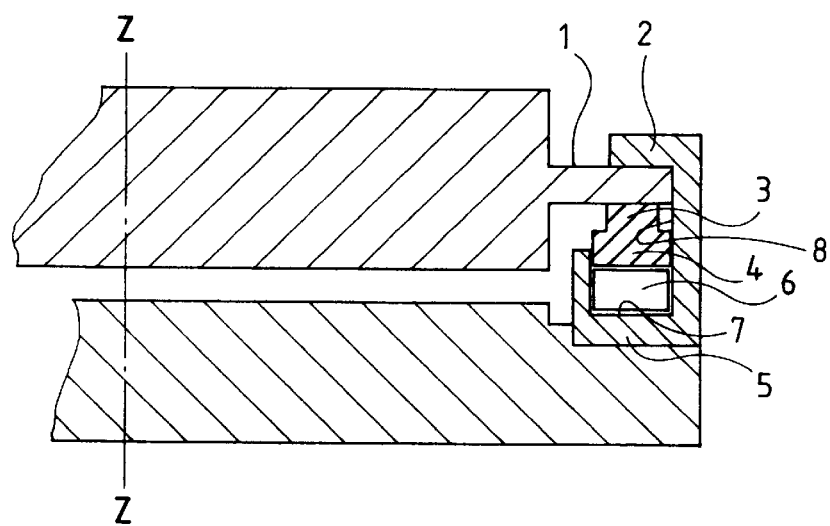
FIG. 2 is a half-view of the same assembly with the device in a locked configuration.

FIGS. 1 and 2 are diagrammatic representations of a rotor B rotating relative to a stator A about a rotation axis Z—Z. These concepts can naturally be reversed: in this description the stator is deemed to be that of the two bodies relative to which the other body is deemed to move.

The rotor B includes an annular rotor flange 1 transverse to the axis.

The stator A includes a fixed annular bearing surface 2 and a mobile annular bearing surface 3 at least partially facing the flange 1 in the axial direction on either side of the latter.

These annular bearing surfaces are transverse to the axis.

The mobile annular bearing surface 3 is formed on a thrust ring 4 radially coupled to a stator portion 5 which retains it radially, in a concentric configuration. The thrust ring 4 moves axially between an unlocked configuration in which the annular bearing surfaces are separated and allow the flange 1 and therefore the rotor to rotate freely (and to move radially and axially), and a locked configuration in which the mobile annular bearing surface is pressed axially towards the fixed annular bearing surface so as to clamp and therefore immobilize the flange.

The thrust ring is moved between these configurations by an annular inflatable airbag 6 disposed in the stator portion 5 between a stator back 7 and the thrust ring.

Figure 3:
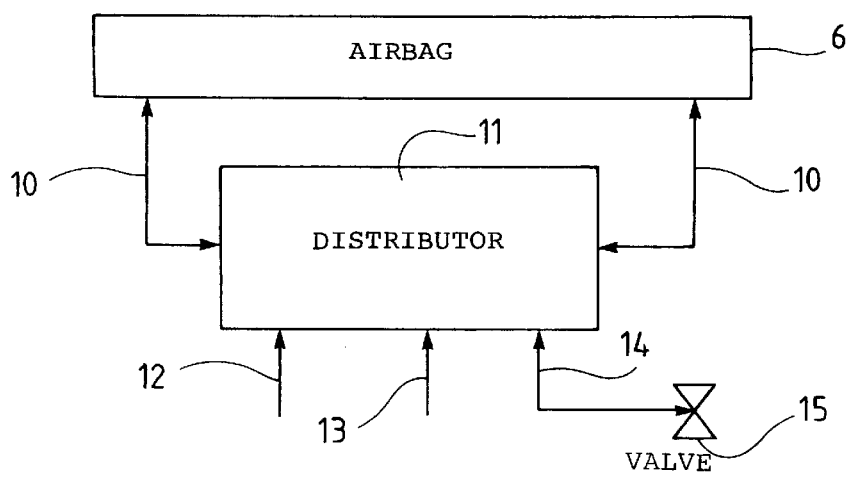
FIG. 3 is a diagrammatic representation of the pneumatic circuit of the device of the invention.

Inlet/outlet means, not shown in FIGS. 1 and 2 and shown diagrammatically in FIG. 3, are provided to convey pneumatic fluid into the airbag (locking) or to remove the fluid from it (unlocking).

In the example under discussion the annular rotor flange 1 has two parallel transverse faces. The flange and therefore the rotor can be effectively retained in the radial direction simply by friction at the interface between the flange and each of the annular bearing surfaces.

The annular rotor flange preferably projects in the radial direction from the periphery of the rotor to optimize retention for a given overall size of the rotor. In a different embodiment, not shown, the flange may be under or on top of the rotor, depending on layout constraints associated with the specific application.

The stator portion 5 preferably has a cylindrical guide wall 8 which retains the thrust ring 4 in the radial direction and guides it axially when it moves between the locked and unlocked configurations.

This guide wall preferably extends as far as the annular stator bearing surface, circumventing the flange in the radial direction.

In this embodiment the guide wall 8 surrounds the thrust ring (with sufficient clearance for easy axial movement). In an alternative embodiment, not shown, the guide wall can be inside the ring, either in combination with a flange projecting radially towards the axis from a peripheral rotor part or in combination with a fixed annular bearing surface that is not directly linked to the stator portion.

The stator portion preferably includes two radially facing cylindrical walls defining with the stator back 7 an annular housing in which substantially all of the inflatable annular airbag is accommodated. One of these walls is advantageously the previously mentioned guide wall 8 (whether it extends as far as the fixed bearing surface or not) and the other wall is a wall 9.

The annular inflatable airbag 6 preferably has two transverse faces and inner and accordion-shape outer radial edges. These edges are preferably simply the shape of the mathematical symbol < or >.

As shown in FIG. 3, the inlet/outlet means advantageously include a plurality of passages 10 discharging into the airbag at a plurality of circumferentially distributed points and each connected to a common distributor 11 having:

a loading channel 12, i.e. a channel at which pneumatic energy is received, a pressure control or manual unlocking channel 13, i.e. a channel provided with selectively operable closure means and pressure measuring means, an access channel 14 provided with a valve 15 for connection to a fluid source or exhaust.

In a simplified embodiment there is only one channel (in which case no distributor is required); it appears that this does not lead to any real risk of tilting.

Figure 4:
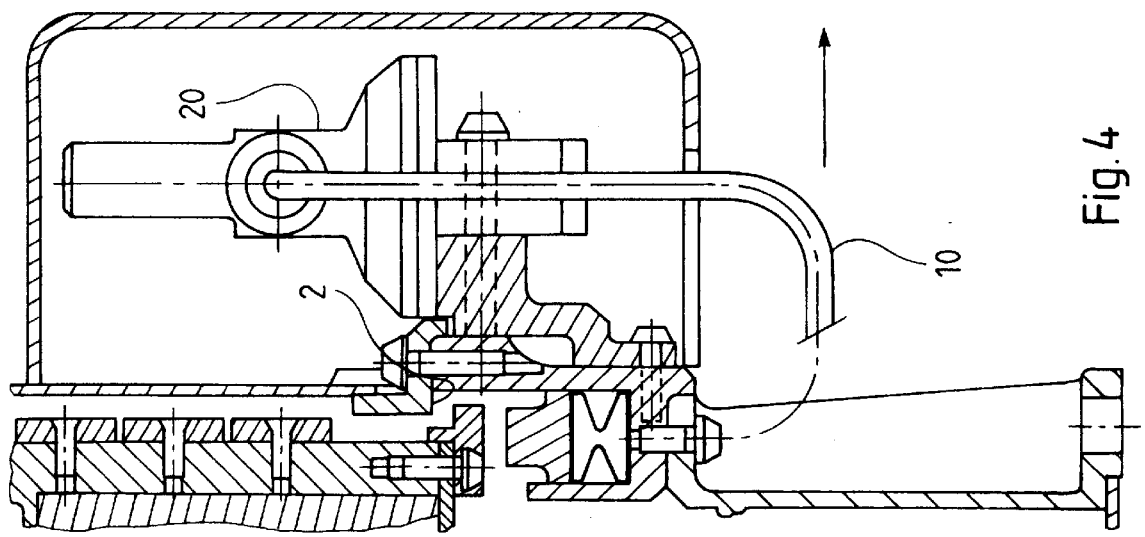
FIG. 4 is a half-view in axial section of one embodiment of the rotor-stator assembly and the device in the FIG. 1 configuration.
Figure 5:
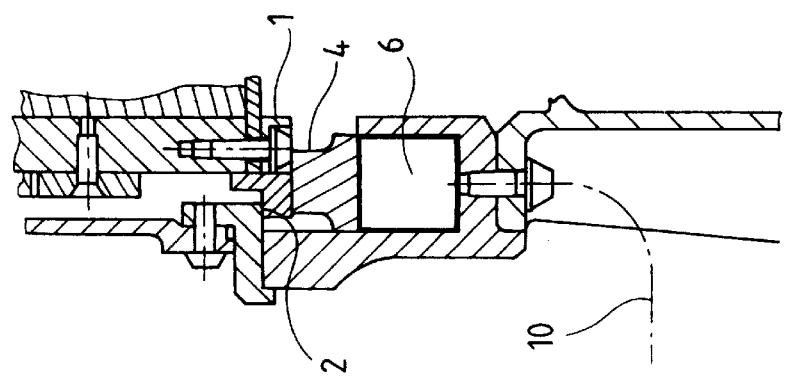
FIG. 5 is a half-view of it in axial section in the FIG. 2 configuration.

FIGS. 4 and 5 show one practical embodiment of an assembly as shown schematically in FIGS. 1 and 2. This example concerns a reaction wheel.

The stator member 5 is fixed to the casing 20 of the assembly; the passages 10 open into the bottom of the housing accommodating the airbag.

An annular member forming the flange 1 is screwed onto the rotor B near its inside peripheral edge.

The reference number 20 shows a pyrotechnic valve and no distributor is shown. It is located under a pyrotechnic valve 20, for example.

The area of contact between the fixed stator bearing surface and flange is very narrow in this embodiment, at the outside edge of the flange. This contact area only just faces the mobile annular bearing surface in the axial direction. It is nevertheless sufficient to retain the rotor effectively, provided that the coefficient of friction between the surfaces in contact is properly controlled.

The travel of the pusher member is at least equal to the sum of the axial clearances between the flange and the fixed and mobile annular bearing surfaces in an unlocked configuration.

It will be realized that the airbag deforms more in the axial direction than in the radial direction, which helps to make the deformation homogeneous all along the airbag. It preferably has the appropriate stiffness inherently (although separate elastic means may be attached to it), so that it returns elastically to its unlocked configuration without any form of aspiration being necessary; to this end the airbag is advantageously made from metal, for example stainless steel (or from fabric-reinforced elastomer). Elastic members may also be provided between the turns of the aforementioned accordion (for example a strip of elastomer glued into the outwardly facing corners). Accordingly, unlocking is effected simply by opening the (pyrotechnic or electric) valve 15.

The device of FIGS. 4 and 5 has the following properties, for example:

travel: 6.5 mm
locking force: ≧36 kN
operating temperature: −30° C. to 70° C.
service life: 13 years
radial force: up to 20 kN
weight: 5 kg It goes without saying that the foregoing description has been given by way of non-limiting example only and that many variants can be proposed by the person skilled in the art without departing from the scope of the invention.

There is claimed:

1. A reaction wheel for use in a spacecraft, said reaction wheel having a stowed, locked position for launch operations and an unlocked position allowing operation of the reaction wheel, comprising:

a stator having a reference axis, a first annular bearing surface and a stator back axially offset with respect to said first annular bearing surface, a thrust ring provided with a second annular bearing surface and axially movable between said first annular bearing surface and said stator back, a wheel of bulky shape rotatably movable with respect to said stator about said reference axis, a peripheral annular flange integrally formed with, and extending radially outwardly from a peripheral edge of, the wheel and at least partially facing said first and second annular bearing surfaces, and an annular inflatable airbag axially extending between and connected to said thrust ring and said stator back, said annular inflatable airbag being provided with pneumatic inlet/outlet means for supplying/discharging fluid, inflation of said annular inflatable airbag axially engaging the thrust ring with said peripheral annular flange and moving said wheel and said peripheral annular flange relative to said stator so as to engage the peripheral annular flange with said first annular bearing surface, lock said wheel with respect to said stator, and resist vibrations generated during a launch of the spacecraft, deflation of said annular inflatable airbag axially disengaging the thrust ring from said peripheral annular flange and the peripheral annular flange from said first annular bearing surface to unlock said wheel with respect to said stator.

2. A reaction wheel according to claim 1 wherein said peripheral annular flange has two parallel transverse faces.

3. A reaction wheel according to claim 1 wherein said stator includes a cylindrical guide wall retaining said thrust ring radially and guiding it axially when it moves axially.

4. A reaction wheel according to claim 3 wherein said cylindrical guide wall extends to said first annular bearing surface and radially circumvents said peripheral annular flange.

5. A reaction wheel according to claim 3 wherein said cylindrical guide wall surrounds said thrust ring with clearance.

6. A reaction wheel according to claim 1 wherein said stator includes two radially facing cylindrical walls defining with said stator back an annular housing in which substantially all of said annular inflatable airbag is accommodated.

7. A reaction wheel according to claim 6 wherein one of said cylindrical walls is extended axially to form a cylindrical guide wall of the same diameter retaining said ring radially and guiding it axially when it moves axially.

8. A reaction wheel according to claim 7 wherein said guide wall surrounds said thrust ring with clearance.

9. A reaction wheel according to claim 1 wherein said inlet/outlet means include at least one passage passing through said stator back.

10. A reaction wheel according to claim 1 wherein said inlet/outlet means include a plurality of passages opening into said airbag and each connected to a distributor.

11. A reaction wheel according to claim 1 wherein said airbag has two transverse faces and accordion-shape inside and outside radial edges.

12. A reaction wheel according to claim 11 wherein said inside and outside radial edges are each the shape of the mathematical symbol > or <.

13. A reaction wheel according to claim 11 wherein said inside and outside radial edges have an axial elasticity urging them towards a retracted configuration.

14. A reaction wheel according to claim 1, wherein said airbag is made from metal.

* * * * *

UNITED STATES PATENT AND TRADEMARK OFFICE
CERTIFICATE OF CORRECTION

| | |
|---|---|
| PATENT NO. | : 6,006,871 |
| DATED | : December 28, 1999 |
| INVENTOR(S) | : Sylvain Leconte et al. |

It is certified that error appears in the above-identified patent and that said Letters Patent is hereby corrected as shown below:

Paragraph [73],
Please change the Assignee information to -- Aerospatiale Societe Nationale Industrielle, Paris, France. --

Signed and Sealed this

Second Day of October, 2001

Attest:

NICHOLAS P. GODICI
*Acting Director of the United States Patent and Trademark Office*

*Attesting Officer*